United States Patent
Tiirola et al.

(10) Patent No.: US 10,574,347 B2
(45) Date of Patent: Feb. 25, 2020

(54) RADIO FRAME CONFIGURATION

(71) Applicant: NOKIA SOLUTIONS AND NETWORKS OY, Espoo (FI)

(72) Inventors: Esa Tapani Tiirola, Kempele (FI); Kari Pekka Pajukoski, Oulu (FI); Kari Juhani Hooli, Oulu (FI)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 15/754,175

(22) PCT Filed: Aug. 25, 2015

(86) PCT No.: PCT/EP2015/069426
§ 371 (c)(1),
(2) Date: Feb. 21, 2018

(87) PCT Pub. No.: WO2017/032408
PCT Pub. Date: Mar. 2, 2017

(65) Prior Publication Data
US 2018/0248616 A1    Aug. 30, 2018

(51) Int. Cl.
*H04J 3/00* (2006.01)
*H04B 7/26* (2006.01)
(Continued)

(52) U.S. Cl.
CPC ......... *H04B 7/2656* (2013.01); *H04L 5/0007* (2013.01); *H04L 5/0082* (2013.01);
(Continued)

(58) Field of Classification Search
USPC ........ 370/329, 280, 229, 276, 281, 330, 336
See application file for complete search history.

(56) References Cited

U.S. PATENT DOCUMENTS 10,159,095 B2 *  12/2018  Lyu ...................... H04W 74/06
2010/0246456 A1   9/2010  Suo et al.
(Continued)

FOREIGN PATENT DOCUMENTS

| JP | 2015111901 A | 6/2015 |
|---|---|---|
| JP | 2015518667 A | 7/2015 |
| WO | 2013141770 A1 | 9/2013 |

OTHER PUBLICATIONS

Office Action for Japanese Application No. 2018-509621, dated Dec. 13, 2018, 7 pages.
International Search Report and Written Opinion for International Application No. PCT/EP2015/069426, dated Jun. 7, 2016 (9 pages).
Office Action for Vietnamese Application No. 1-2018-01227, dated May 16, 2018, 2 pages.
Office Action for Japanese Patent Application No. 2018-509621, dated Jul. 29, 2019, 3 pages.
(Continued)

*Primary Examiner* — Phuongchau Ba Nguyen
(74) *Attorney, Agent, or Firm* — Brake Hughes Bellermann LLP (57) ABSTRACT

There is provided a frame structure for a cellular communication system. According to an embodiment, there is provided a first radio frame configuration defining a frame structure of a radio frame comprising at least one sub-frame dedicated only for downlink transmission. There is also provided a second radio frame configuration defining a frame structure of a radio frame comprising at least one flexible special sub-frame configurable as either a flexible downlink sub-frame or as a flexible uplink sub-frame, wherein the flexible downlink sub-frame and the flexible uplink sub-frame both comprise an uplink part and a downlink part, and wherein both the uplink part and the downlink part carry at least one of control information and a reference signal. Amongst a set of radio frame configurations comprising at least the first and second radio frame configuration, a radio frame configuration is selected and a radio signal carrying an information element indicating the selected radio frame configuration is exchanged in order to configure the selected radio frame configuration for use in the cellular communication system.

21 Claims, 6 Drawing Sheets

(51) Int. Cl.
*H04W 72/04* (2009.01)
*H04W 72/12* (2009.01)
*H04L 5/00* (2006.01)

(52) U.S. Cl.
CPC ..... *H04W 72/042* (2013.01); *H04W 72/0446* (2013.01); *H04W 72/1205* (2013.01)

(56) References Cited

U.S. PATENT DOCUMENTS

| 2011/0176461 A1* | 7/2011 | Astely | H04B 7/2656 |
| | | | 370/280 |
| 2015/0043392 A1* | 2/2015 | Susitaival | H04L 5/1469 |
| | | | 370/280 |

OTHER PUBLICATIONS

Office Action for European Application No. 15753070.0, date Nov. 11, 2019, 7 pages.
TSG-RAN WG1 #51; R1-075020; "Way Forward on LTE TDD Frame Structure"; Jeju, Korea, Nov. 5-9, 2007; 2 pages.

* cited by examiner

RADIO FRAME CONFIGURATION

CROSS-REFERENCE TO RELATED APPLICATIONS

This application is a national stage entry of PCT Application No. PCT/EP2015/069426 filed Aug. 25, 2015, entitled "RADIO FRAME CONFIGURATION" which is hereby incorporated by reference in its entirety.

TECHNICAL FIELD

The invention relates to wireless communications in a cellular communication system and, in particular, frame configurations in a cell.

BACKGROUND

The need for development of telecommunication is being driven by the increasing demand for mobile data and the emergence of the Internet of Things (IoT), through which even billions of devices will become connected. In the future, technologies, such as remote healthcare and advanced logistics, will require much shorter network response times to enable rapid reactions.

BRIEF DESCRIPTION

According to an aspect, there is provided the subject matter of the independent claims. Some embodiments are defined in the dependent claims.

One or more examples of implementations are set forth in more detail in the accompanying drawings and the description below. Other features will be apparent from the description and drawings, and from the claims.

BRIEF DESCRIPTION OF DRAWINGS

In the following embodiments will be described in greater detail with reference to the attached drawings, in which.

DETAILED DESCRIPTION OF SOME EMBODIMENTS

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Universal Mobile Telecommunication System (UMTS, 3G) based on basic wideband-code division multiple access (W-CDMA), high-speed packet access (HSPA), Long Term Evolution (LTE), LTE-Advanced, and/or 5G system. The present embodiments are not, however, limited to these systems.

The embodiments are not, however, restricted to the system given as an example but a person skilled in the art may apply the solution to other communication systems provided with necessary properties. One example of a suitable communications system is the 5G system, as listed above. It is assumed that network architecture in 5G will be quite similar to that of the LTE-advanced. 5G is likely to use multiple input-multiple output (MIMO) antennas, many more base stations or nodes than the current network deployments of LTE (a so-called small cell concept), including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labor between core network operations and base station operations may differ from that of the LTE or even be non-existent. Some other technology advancements probably to be used are Software-Defined Networking (SDN), Big Data, and all-IP, which may change the way networks are being constructed and managed.

Figure 1:
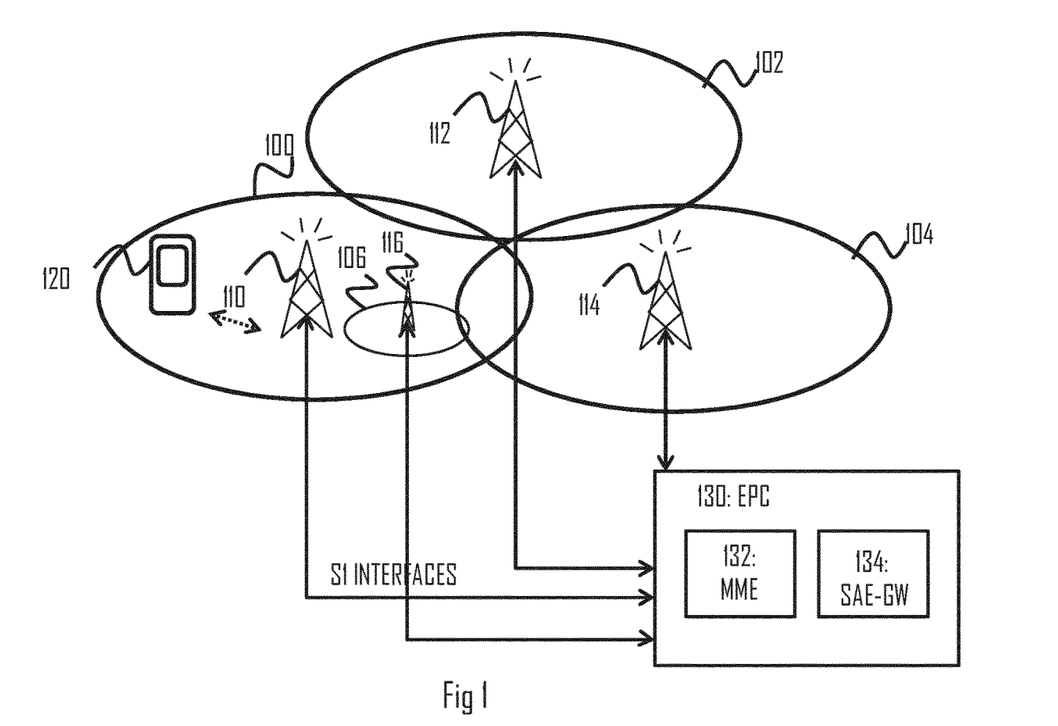
FIG. 1 illustrates a wireless communication system to which embodiments of the invention may be applied.

FIG. 1 illustrates an example of a cellular communication system to which embodiments of the invention may be applied. Cellular radio communication networks, such as the Long Term Evolution (LTE), the LTE-Advanced (LTE-A) of the $3^{rd}$ Generation Partnership Project (3GPP), or the predicted future 5G solutions, are typically composed of at least one network element, such as a network element 110, providing a cell 100. Each cell may be, e.g., a macro cell, a micro cell, femto, or a pico cell, for example. The network element 110 may be an evolved Node B (eNB) as in the LTE and LTE-A, or any other apparatus capable of controlling radio communication and managing radio resources within a cell. For 5G solutions, the implementation may be similar to LTE-A, as described above. The network element 110 may be called a base station or an access node. The cellular communication system may be composed of a radio access network of network elements 110, 112, 114, e.g. eNBs, each controlling a respective cell or cells 100, 102, 104. The network elements 110 to 114 may each control a macro cell 100 to 104 providing wide area coverage for terminal devices 120. The network elements 110 to 114 may also be called access nodes because they provide the terminal devices 120 with wireless access to other networks such as the Internet. Additionally, one or more local area access nodes 116 may be arranged within a control area of a network element 110, 112, 114 controlling a macro cell, 100 to 104. The local area access node 116 may provide wireless access within a sub-cell 106 that may be comprised within a macro cell 100. Examples of the sub-cell may include a micro, pico and/or femto cell. Typically, the sub-cell provides a hot spot within a macro cell. The operation of the local area access node 116 may be controlled by a network element 110 under whose control area the sub-cell is provided. The network element 110 and the other network elements 112 to 116 may support Dual Connectivity (DC) in which the terminal device 120 has established multiple radio resource control (RRC) connections with the radio access network comprising the network elements 110 to 116. The terminal device 120 may establish one RRC connection with the network element 110 and another RRC connection with the local area access node 116 for improved performance of communications.

The network element 110 alone or together with the other network element 116 may employ carrier aggregation in which the terminal device 112 is allocated with resources from a plurality of component carriers that may be on contiguous frequency bands or on non-contiguous frequency bands. One network element 110 may provide one component carrier, e.g. a primary component carrier, while another network element 116 may provide another component carrier, e.g. a secondary component carrier. The network element 110 operating the primary component carrier may carry out scheduling of resources on all component carriers, or each network element 110, 116 may control scheduling of the component carrier it operates. Alternatively network element 110 may provide one component carrier, e.g. a primary component carrier, as well as another component carrier, e.g. a secondary component carrier.

In the case of multiple eNBs in the communication network, the eNBs may be connected to each other with an X2 interface as specified in the LTE. Other communication methods between the network elements may also be possible. The network elements 110 to 116 may be further connected via an S1 interface to an evolved packet core (EPC) 130, more specifically to a mobility management entity (MME) 132 and to a system architecture evolution gateway (SAE-GW) 134.

The radio system of FIG. 1 may support Machine Type Communication (MTC). MTC may enable providing service for a large amount of MTC capable devices, such as the at least one terminal device 120. The at least one terminal device 120 may comprise mobile phones, smart phones, tablet computers, laptops and other devices used for user communication with the radio communication network, such as a MTC network. These devices may provide further functionality compared to the MTC scheme, such as communication link for voice, video and/or data transfer. However, in MTC perspective the at least one terminal device 120 may be understood as a MTC device. It needs to be understood that the at least one terminal device 120 may also comprise another MTC capable device, such as a sensor device providing position, acceleration and/or temperature information to name a few examples.

In MTC, the radio communication network may need to handle a massive amount of uncoordinated accesses by the MTC devices. As the amount of MTC devices may be quite high, network access may be a limiting factor, compared to the conventional network limitations, where interference and/or limited coverage may pose a problem. Most of the MTC devices may have a small amount of data to be transmitted in sporadic fashion. This may enable the MTC devices to spend majority of time in sleep mode, disconnected from the network element 110 to 116 and/or the cellular communication network. Thus, the MTC devices may have a requirement of very small energy small energy consumption.

Figure 2:
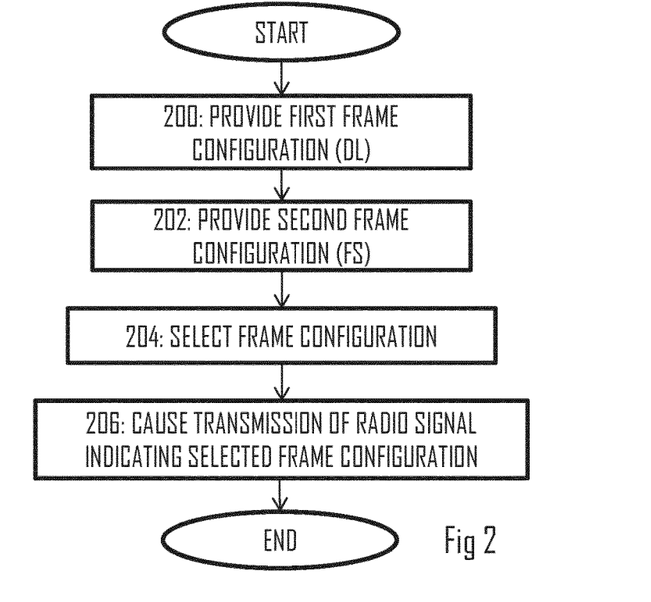
FIGS. 2 and 3 illustrate processes for selecting a frame configuration according to some embodiments of the invention.
Figure 3:
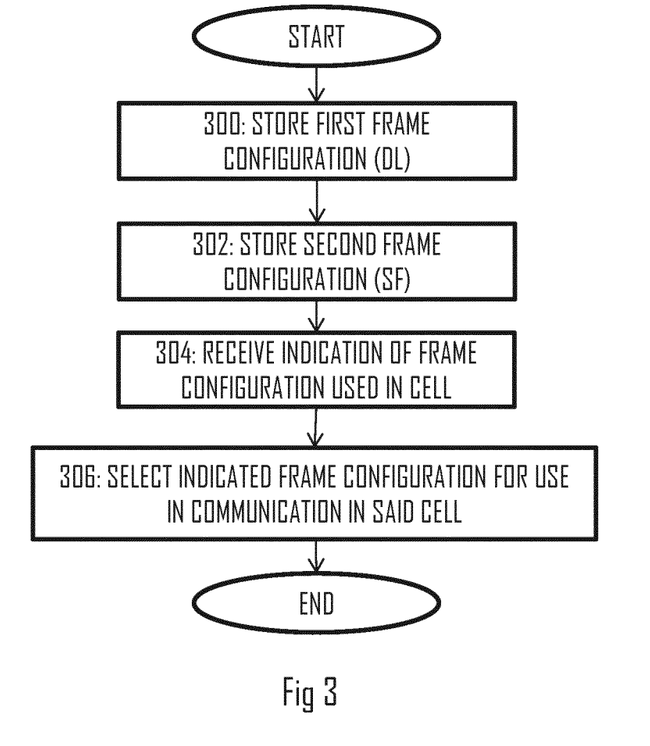

FIGS. 2 and 3 illustrates processes for configuring frame transmissions in a cell of a cellular communication system, e.g. the cell 100 provided by a network element 110. FIG. 2 illustrates a process executed in the network element 110 controlling the cell 100, and FIG. 3 illustrates a process executed in a terminal device 120 located in the cell 100 and carrying out communication with the network element 110 in the cell 100.

Referring to FIG. 2, the network element 110 provides a first radio frame configuration defining a frame structure of a radio frame comprising at least one sub-frame dedicated only for downlink transmission (block 200). The network element also provides a second radio frame configuration defining a frame structure of a radio frame comprising at least one flexible special sub-frame configurable as either a flexible downlink sub-frame or as a flexible uplink sub-frame, wherein the flexible downlink sub-frame and the flexible uplink sub-frame both comprise an uplink part and a downlink part, and wherein both the uplink part and the downlink part carry at least one of control information and a reference signal (block 202). In block 204, the network element selects a radio frame configuration amongst a set of radio frame configurations comprising at least the first and second radio frame configuration. In block 206, the network element causes transmission of a radio signal carrying an information element indicating the selected radio frame configuration.

Referring to FIG. 3, the terminal device terminal device 120 stores in block 300 definitions for a first radio frame configuration defining a frame structure of a radio frame comprising at least one sub-frame dedicated only for downlink transmission. The terminal device further stores in block 302 definitions for a second radio frame configuration defining a frame structure of a radio frame comprising at least one flexible special sub-frame configurable as either a downlink sub-frame or as an uplink sub-frame, wherein the flexible downlink sub-frame and the flexible uplink sub-frame both comprise an uplink part and a downlink part, and wherein both the uplink part and the downlink part carry at least one of control information and a reference signal. In block 304, the terminal device 120 receives from the network element 110 a radio signal carrying an information element indicating a radio frame configuration applied in a cell of the cellular communication system. On the basis of the received information element, the terminal device selects in block 306 a radio frame configuration amongst a set of radio frame configurations comprising at least the first radio frame configuration and the second radio frame configuration and using the selected frame communication in communication with the network element in the cell.

In an embodiment, the first radio frame configuration further comprises at least one sub-frame dedicated only for uplink transmission, and at least one special sub-frame comprising the uplink part and the downlink part. The first radio frame configuration may comply with the LTE radio frame configuration. Table 1 below illustrates a conventional radio frame configuration for a time-division TD-LTE system. Table 1 illustrates a structure for a radio frame comprising ten (10) sub-frames. The radio frame may be a 10 millisecond (ms) frame, thus making a sub-frame a 1 ms sub-frame in the TD-LTE.

TABLE 1

| Radio frame configuration | DL-to-UL Switch periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, "D" refers to a downlink sub-frame dedicated only for downlink transmission, e.g. from an access node to a terminal device, "U" refers to an uplink sub-frame dedicated only for uplink transmission, e.g. from the terminal device to the access node, and "S" refers to a special sub-frame comprising an uplink part and a downlink part. The special sub-frame configuration is indicated in the LTE system by the network element 110 to 116 in a system information block 1 (SIB1), thus making it a semi-static parameter. It means that all the special sub-frames in the radio frame configuration are the same type of special sub-frames. The special sub-frame may be considered as a guard sub-frame when shifting from downlink sub-frame to an uplink sub-frame.

In an embodiment, the set of radio frame configurations comprise one or more or even all the radio frame configurations of Table 1, wherein one of the radio frame configurations of Table 1 is the first radio frame configuration.

The second radio frame configuration comprises at least one flexible special sub-frame that may be configured as the downlink special sub-frame or the uplink special sub-frame. In both configurations, the flexible special sub-frame comprises the bidirectional control/reference signal, thus enabling bidirectional communication of non-data information within every flexible special sub-frame. Depending on the configuration of the flexible special sub-frame, either downlink or uplink transmission may be emphasized such that a downlink special sub-frame may comprise more downlink transmission time than uplink transmission time, while an uplink special sub-frame may comprise more uplink transmission time than downlink transmission time.

In an embodiment, one configuration of the flexible special sub-frame allocates equal amounts of transmission time to both uplink and downlink.

In an embodiment, each configuration of the flexible special sub-frame also defines a length of a guard period between the downlink part and the uplink part. Different configurations may define different lengths of the guard period. As a consequence, the structure of the flexible special sub-frame in terms of the lengths and order of the uplink part, downlink part, and the guard period may be configurable by the network element.

Table 2 below illustrates an embodiment of some radio frame configurations that read on to the second radio frame configuration. The one or more or even all the radio frame configurations of Table 2 may be comprised in the set of radio frame configurations from which the network element 110 selects the radio frame configurations to be used in the cell. The selection may be a cell-specific selection but, in some embodiments, the network element 110 may select the radio frame configuration for each user or a group of users. As a consequence, the network element may employ a plurality of radio frame configurations in parallel, wherein different radio frame configurations are in use for different users or user groups.

TABLE 2

| Fr. Conf. | DL2UL Per. | Sub-frame Length | Sub-frame number | | | | | | | | | |
|---|---|---|---|---|---|---|---|---|---|---|---|---|
| | | | 0 | 1 | 2 | 3 | 4 | 5 | 6 | 7 | 8 | 9 |
| 7 | 1 ms | 1 ms | SF | SF | SF | SF | SF | SF | SF | SF | SF | SF |
| 8 | 1 ms | 1 ms | SD | SF | SU | SF | SF | SF | SF | SF | SF | SF |
| 9 | 0.25 ms | 0.25 ms | SF | SF | SF | SF | SF | SF | SF | SF | SF | SF |
| 10 | 0.25 ms | 0.25 ms | SD | SF | SU | SF | SF | SF | SF | SF | SF | SF |
| 11 | 0.1 ms | 0.1 ms | SF | SF | SF | SF | SF | SF | SF | SF | SF | SF |
| ... | ... | ... | ... | ... | ... | ... | ... | ... | ... | ... | ... | ... |

In Table 2, "SF" denotes the flexible special sub-frame that may be dynamically configured as either a flexible special downlink sub-frame or a flexible special uplink sub-frame, "SD" denotes a flexible special sub-frame that is statically (or semistatically) configured as the flexible special downlink sub-frame, and "SU" denotes a flexible special sub-frame that is statically (or semistatically) configured as the flexible special uplink sub-frame. SD may be considered as SF that is statically (or semistatically) configured as the flexible special downlink sub-frame, and SU may be considered as SF that is statically (or semistatically) configured as the flexible special uplink sub-frame. SD and SU may thus each comprise the downlink part and the uplink part as described above, thus distinguishing from D and U of Table 1. The use of statically or semi-statically configured flexible-special sub-frames may provide improvements from inter-cell interference coordination point of view. It may also enable use of more sophisticated channel estimation and power control for the sub-frames SD and SU than for the sub-frames SF. SD and SU may be used for special purposes, such as for transfer of important or even critical signaling messages.

In the embodiment of Table 2, some of the radio frame configurations consist of flexible special sub-frames dynamically configurable as flexible special uplink or downlink sub-frames, e.g. radio frame configurations 7, 9, and 11. In some of the radio frame configurations of Table 2, the flexible special sub-frames dynamically configurable as flexible special uplink or downlink sub-frames form a subset of the sub-frames, e.g. radio frame configurations 8 and 10. In the radio frame configurations 8 and 10, the flexible special sub-frames dynamically configurable as flexible special uplink or downlink sub-frames still form a majority of the sub-frames in the radio frame configuration.

In a modification of the set of radio frame configurations of Table 2, at least some of the radio frame configurations may comprise downlink sub-frames D and/or uplink sub-frames U of Table 1 such that each radio frame configuration of Table 2 still comprises at least one flexible special sub-frame SF, SD, or SU. The flexible special sub-frames may still form a majority of the sub-frames in the at least some of the radio frame configurations, thus providing for flexible adaptation between uplink and downlink. In an embodiment, all the sub-frames in at least one radio frame configuration are flexible special sub-frames.

Providing most or even all the sub-frames as the flexible special sub-frames with bidirectional control (through the uplink and downlink part in each sub-frame) may reduce latency compared with the radio frame configurations of Table 1. In the radio frame configurations of Table 1, there may be even nine consecutive downlink frames between two uplink sub-frames (configuration 5). This may cause huge delays in uplink communications, e.g. transmission of acknowledgment messages ACK/NAK, which can be transmitted only in uplink sub-frames. Providing at least the majority of sub-frames as sub-frames supporting bidirectional control enables reduction of the latency, reduction of parallel hybrid automatic repeat request (HARQ) processes and HARQ buffers. In the case where all the sub-frames are flexible special sub-frames, the HARQ processes including HARQ acknowledgment scheduling may be carried out in a similar manner as in a frequency division duplexing (FDD) system, e.g. FDD LTE as acknowledgement messages can be transmitted in each subframe on both DL and UL direction.

Figure 4:
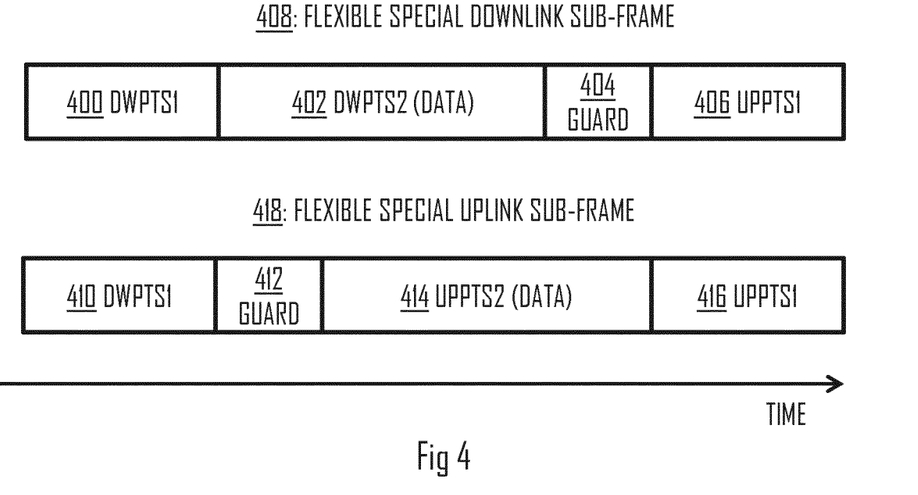
FIG. 4 illustrates frame structures for a flexible special sub-frame according to an embodiment of the invention.

Let us now describe some embodiments of the flexible special sub-frame with reference to FIG. 4. FIG. 4 illustrates an embodiment of the flexible special downlink sub-frame 408 and an embodiment of the flexible special uplink sub-frame 418. Referring to the flexible special downlink sub-frame 408, the sub-frame 408 may comprise the downlink part 400 and the uplink part 406 and a guard period 404 between the downlink part and the uplink part. The downlink part 400 is denoted by a downlink pilot time slot (DwPTS) and the uplink part 406 is denoted by an uplink pilot time slot (UpPTS) following the terminology of the LTE. The downlink part 400 may carry one or more downlink control channels and/or downlink reference signals, e.g. downlink sounding reference signals. The reference signal may be used in channel estimation, cell discovery, synchronization, etc. The downlink control channels carried in the downlink part may comprise a physical downlink control channel (PDCCH) and/or other physical layer control channels. The downlink part 400 may carry user data on a physical downlink shared channel (PDSH), for example.

The flexible special downlink sub-frame 408 may comprise a further downlink part 402. The further downlink part may comprise or consist of downlink data which may be payload data addressed to a terminal device 120.

The uplink part 406 may comprise uplink control signals and/or uplink reference signals. The uplink control signals may include at least one of the following: an acknowledgment message ACK/NAK of a HARQ process, a scheduling request (SR) requesting for scheduling of uplink transmission resources, a channel state indicator (CSI) indicating a quality of a radio environment between the network element 110 and the terminal device 120.

Referring to the flexible special uplink sub-frame 418, the sub-frame 418 may comprise the downlink part 410 and the uplink part 416 and a guard period 412 between the downlink part and the uplink part. As with the flexible special downlink sub-frame 408, the downlink part 410 is denoted by a downlink pilot time slot (DwPTS) and the uplink part 416 is denoted by an uplink pilot time slot (UpPTS). The downlink part 410 may carry one or more downlink control channels and/or downlink reference signals, e.g. downlink sounding reference signals.

The flexible special downlink sub-frame 408 may comprise a further uplink part 414. The further uplink part 414 may comprise or consist of uplink data which may be payload data originated from a terminal device 120.

The uplink part 416 may comprise uplink control signals and/or uplink reference signals. The uplink control signals may include at least one of the following: an acknowledgment message ACK/NAK of a HARQ process, a scheduling request (SR) requesting for scheduling of uplink transmission resources, a channel state indicator (CSI) indicating a quality of a radio environment between the network element 110 and the terminal device 120.

As illustrated in FIG. 4, the flexible special downlink sub-frame 408 comprises the further downlink part 402 for transmission of downlink data, while the flexible special uplink sub-frame 408 comprises the further uplink part 402 for transmission of the uplink data.

In some embodiments, the flexible special sub-frame may comprise the further downlink part 402 and the further uplink part 414. The definition of whether the flexible special sub-frame is a flexible special uplink sub-frame or a flexible special downlink sub-frame may depend on the allocation of transmission resources to the link directions in the sub-frame. If the downlink direction is allocated with more transmission resource than the uplink direction, the sub-frame may be defined as the flexible special downlink sub-frame. If the uplink direction is allocated with more transmission resource than the downlink direction, the sub-frame may be defined as the flexible special uplink sub-frame. Allocation of transmission resources to the link directions may be done dynamically.

As illustrated in Table 2, the length of the sub-frame may be defined separately for each radio frame configuration. Accordingly, different sub-frame lengths may be applied for different radio frame configurations.

In an embodiment, the sub-frame length of some or even all radio frame configurations of Table 2 is 1 ms, as in Table 1.

In an embodiment employing multiple sub-frame lengths for the radio frame configurations, a shorter sub-frame length may be associated with a greater sub-carrier spacing of a multicarrier signal transmitted in the shorter sub-frame, while a longer sub-frame length may be associated with a smaller sub-carrier spacing of the multicarrier signal. For example when applied to a 20 Megahertz (MHz) carrier, 1 ms sub-frame may employ the sub-carrier spacing of 15 kilohertz (kHz), while 0.25 ms sub-frame may employ 60 kHz sub-carrier spacing. In these examples, a presumption may be a fixed size of a fast Fourier transform. Increasing the sub-carrier spacing increases the bandwidth of the multicarrier signal, e.g. 60 kHz spacing when applied to the 20 MHz carrier may result in an 80 MHz carrier bandwidth. A similar time-frequency scaling may be applied to realize variable sub-frame lengths. A general purpose may be to transfer the same number of sub-carriers and multicarrier symbols, and the time-frequency scaling is used to increase the sub-carrier spacing and decrease the sub-frame length or to decrease the sub-carrier spacing and increase the sub-frame length.

In another embodiment, the different sub-frame lengths may be applied by allocating a different number of symbols, e.g. the multicarrier symbols. For example, a radio frame configuration using the sub-frame length of 1 ms may comprise more multicarrier symbols than a radio frame configuration using the sub-frame length of 0.25 ms. In other words, a radio frame configuration using the sub-frame length of 1 ms may comprise more sub-carriers than a radio frame configuration using the sub-frame length of 0.25 ms, resulting in constant carrier bandwidth.

Yet another approach is to use variable bandwidths such that radio frame configurations with different sub-frame length are assigned to carriers with different bandwidths. For example, 1 ms sub-frame may be employed on carriers or in cells with bandwidths of 20 MHz and below, while sub-frames shorter than 1 ms may be employed for carriers or cells with bandwidths above the 20 MHz.

Yet another embodiment is a combination of above-described embodiments. For example, different parts of the sub-frame may employ different sub-carrier spacing and/or bandwidth. For example, the further downlink part 402 and the further uplink part 414 may employ a first sub-carrier spacing and the downlink part 400, 410 and the uplink part 406, 416 may employ a second, different sub-carrier spacing. The same cyclic prefix may, however, be applied to all symbols of a sub-frame. Combined duration of the downlink part 400/410, uplink part 406/416, and the guard period 404/412 of a sub-frame may be equal to the duration of a single or multiple multicarrier symbols of the further downlink/uplink part 402, 414 of the sub-frame. The length of the radio frame may be the same for all radio frame configurations in terms of a number of sub-frames, e.g. ten sub-frames as in the embodiment of Table 2. Correspondingly, the length of radio frame in time may scale for different radio frame configurations, corresponding to the scaling sub-frame length.

In an embodiment, an arbitrary timing within a sub-frame may be indicated by employing time-domain scaling of sub-frames. For example, a periodic radio resource may be indicated in such a manner.

In an embodiment, the first part of the flexible special sub-frame is the downlink part in all radio frame configurations and/or in all sub-frame configurations. As a consequence, the uplink part or the further uplink part may be the last part of the flexible special sub-frame. Subsequent to the downlink part, a further downlink part or a guard period may be arranged in the sub-frame.

In an embodiment, the further downlink part and the downlink part are consecutive parts in the sub-frame. Similarly, the further uplink part and the uplink part may be consecutive parts in the sub-frame.

In an embodiment, the network element 110 supports the radio frame configurations of Table 1 and radio frame configurations of Table 2. In another embodiment, the network element supports only the radio frame configurations of Table 2, e.g. only radio frame configurations comprising the flexible special sub-frames.

Let us next describe some embodiments defining some proportions of the downlink parts 400, 402, 410 and the uplink parts 406, 414, 416 of the flexible special sub-frames. Table 3 below illustrates some sub-frame configurations of the flexible special sub-frame. The length of the sub-frames is constant 14 symbols in the embodiment of Table 3.

TABLE 3

| Flexible Special Sub-frame Configuration | Length | DwPTS | Guard Period | UpPTS |
| --- | --- | --- | --- | --- |
| 0 | 1 ms | 3 | 10 | 1 |
| 1 | 1 ms | 9 | 4 | 1 |
| 2 | 1 ms | 10 | 3 | 1 |
| 3 | 1 ms | 11 | 2 | 1 |
| 4 | 1 ms | 12 | 1 | 1 |
| 5 | 1 ms | 3 | 9 | 2 |
| 6 | 1 ms | 9 | 3 | 2 |
| 7 | 1 ms | 10 | 2 | 2 |
| 8 | 1 ms | 11 | 1 | 2 |
| 9 | 1 ms | 6 | 6 | 2 |
| 10 | 1 ms | 1 | 3 | 10 |
| 11 | 1 ms | 1 | 2 | 11 |
| 12 | 1 ms | 1 | 1 | 12 |
| 13 | 1 ms | 2 | 3 | 9 |
| 14 | 1 ms | 2 | 2 | 10 |
| 15 | 1 ms | 2 | 1 | 11 |

As described above, the length of the flexible special sub-frame may vary depending on the time-frequency scaling, for example. Therefore, the lengths mentioned in Table 3 may be considered exemplary and could equally be defined as "variable".

Table 4 below illustrates some further sub-frame configurations of the flexible special sub-frame. The length of the sub-frames is in this embodiment variable.

TABLE 4

| Flexible Special Sub-frame Configuration | Length | DwPTS | Guard Period | UpPTS |
| --- | --- | --- | --- | --- |
| 0 | 1 ms | 3 | 10 | 1 |
| 1 | 1 ms | 9 | 4 | 1 |
| 2 | 1 ms | 10 | 3 | 1 |
| 3 | 1 ms | 11 | 2 | 1 |
| 4 | 1 ms | 12 | 1 | 1 |
| 5 | 1 ms | 3 | 9 | 2 |
| 6 | 1 ms | 9 | 3 | 2 |
| 7 | 1 ms | 10 | 2 | 2 |
| 8 | 1 ms | 11 | 1 | 2 |
| 9 | 1 ms | 6 | 6 | 2 |
| 10 | 0.5 ms | 1 | 1 | 5 |
| 11 | 0.5 ms | 5 | 1 | 1 |
| 12 | 0.5 ms | 2 | 1 | 4 |
| 13 | 0.5 ms | 4 | 1 | 2 |
| 14 | 0.5 ms | 3 | 1 | 3 |

In the embodiments where the network element supports radio frame configurations of Tables 1 and 2, the network element may employ at least partially same sub-frame configurations of Table 3 or Table 4 for the special sub-frames and for the flexible special sub-frames. For example, sub-frame configurations 0 to 9 may be applied to both special sub-frames and flexible special sub-frames. However, some sub-frame configurations may be applicable only to the flexible special sub-frames, e.g. sub-frame configurations 10 to 15 in Table 3 and 10 to 14 in Table 4.

With respect to the mutual proportions of the downlink part and the further downlink part in the flexible special downlink sub-frame and the mutual proportions of the uplink part and the further uplink part in the flexible special uplink sub-frame, some embodiments are described herein. In an embodiment, the length of the downlink part 400, 410 and the uplink part 406, 416 may be fixed, e.g. one multicarrier symbol. The length of the guard periods 404, 412 is defined by the Tables 3 and 4. The remaining part is then used for the further downlink/uplink part. In another embodiment, the lengths of the downlink part 400, 410, uplink part 406, 416, the further downlink part 402, and the further uplink part 414 are signaled explicitly or defined in the sub-frame configurations.

For example, the sub-frame configuration 2 may define a flexible special downlink sub-frame 408 having one-symbol for the downlink part 400, 9 symbols for the further downlink part 402, three symbols for the guard period 404 and one symbol for the uplink part 406.

For example, the sub-frame configuration 4 may define a flexible special downlink sub-frame 408 having one-symbol for the downlink part 400, 11 symbols for the further downlink part 402, and one symbol for the guard period 404 and the uplink part 406 each.

For example, the sub-frame configuration 12 of Table 3 may define a flexible special uplink sub-frame 418 having one-symbol for the downlink part 410, one symbol for the guard period 412, 11 symbols for the further uplink part 414, and one symbol for the uplink part 416.

For example, the sub-frame configuration 12 of Table 4 may define a flexible special uplink sub-frame 418 having two symbols for the downlink part 410, one symbol for the guard period 412, 3 symbols for the further uplink part 414, and one symbol for the uplink part 416.

Figure 5:
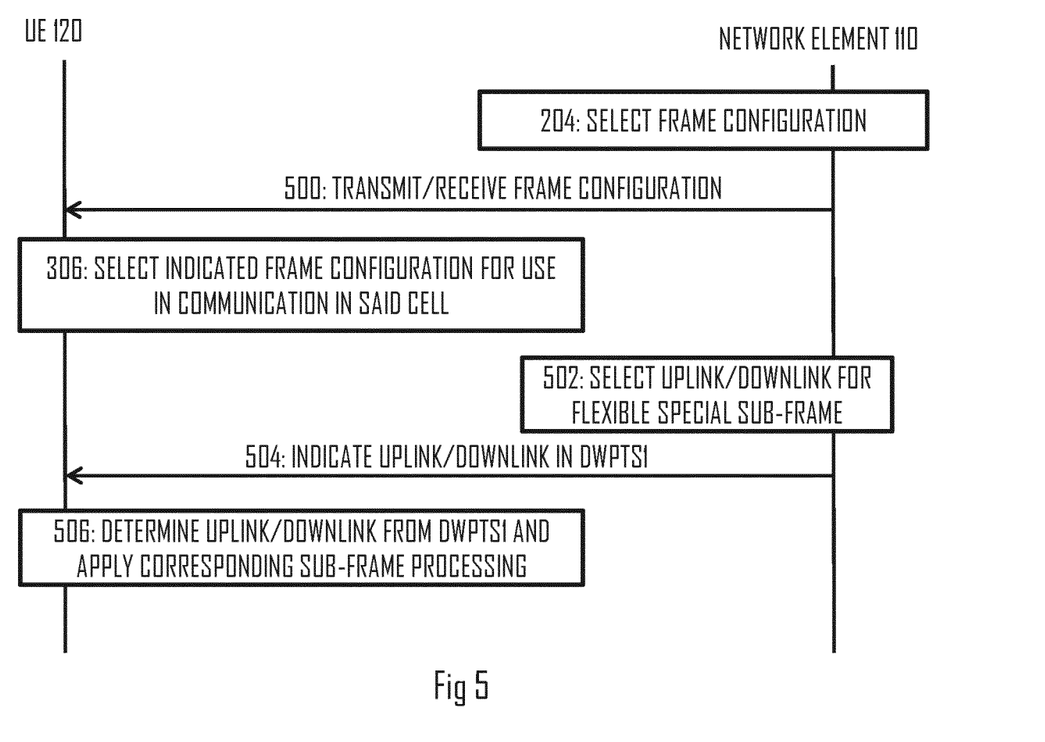
FIG. 5 illustrates a signaling diagram describing signaling of a sub-frame configuration for the flexible special sub-frame according to an embodiment of the invention.

In an embodiment, the first part of the flexible special sub-frame is the downlink part 400, 410 in all sub-frame configurations. This enables dynamic indication of the link direction of the flexible special sub-frame in the sub-frame itself. The link direction may be indicated on a control channel carried in the downlink part 400, 410. Dynamic scheduling enables fast adaptation of the sub-frame configurations to the current traffic demand, which improves the performance. FIG. 5 illustrates an embodiment of the dynamic selection of the link direction for the flexible special sub-frames.

Referring to FIG. 5, the network element 110 selects the radio frame configuration for a cell in block 204 and signals the selected radio frame configuration in the cell in step 500, and the terminal device 120 receives the radio frame configuration in step 500 and applies the radio frame configuration in block 306. The functions 204, 500, 306 may be carried out in the above-described manner. In block 502, the network element selects the link direction for a next sub-frame. The selection may be based on the amount of downlink data stored in the network element for transmission (the need for downlink resources), the number of pending uplink scheduling requests (the need for uplink resources), or another criterion/criteria. Upon selecting the link direction for the next sub-frame, the network element may insert into a downlink part of the next sub-frame an information element indicating the link direction of the sub-frame and start transmitting the downlink part of the sub-frame (step 504). When the sub-frame starts, the terminal device may start scanning for the control channel of the downlink part in order to determine the link direction of the sub-frame and, in some embodiments, another information element indicating whether or not the terminal device has resources allocated to the sub-frame. If the terminal device has resources in the sub-frame, the terminal device may carry out signal processing according to the information element indicating the link direction of the sub-frame (block 506). For example, if the terminal device has been allocated an uplink transmission resource in the sub-frame identified by the information element as a flexible special uplink sub-frame, the terminal device may transmit uplink data in the further uplink part of the sub-frame.

In an embodiment, the information element carried in the downlink part of the sub-frame in step 504 may be a sub-frame configuration index of Table 3 or Table 4.

Figure 6:
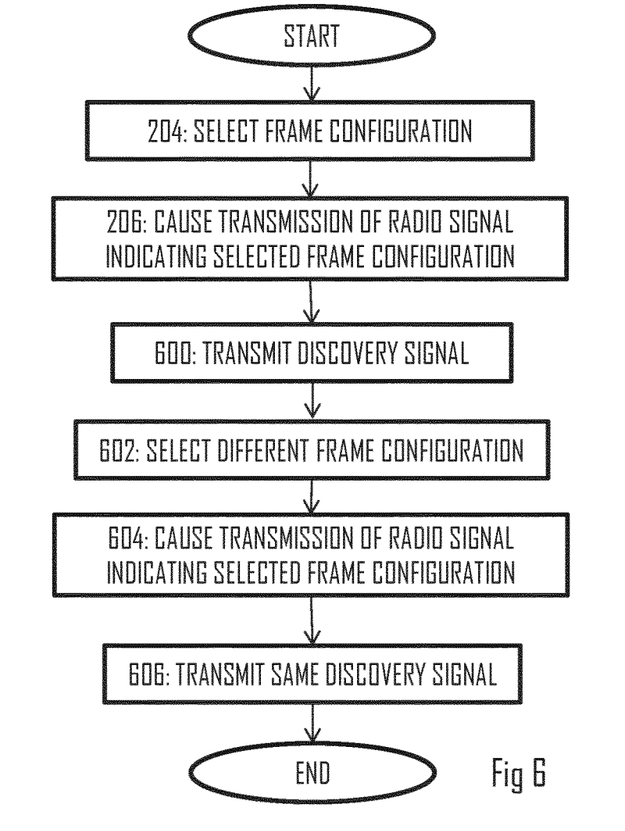
FIGS. 6 and 7 illustrate processes for configuring and transmitting a discovery reference signal in a cell according to an embodiment of the invention.
Figure 7:
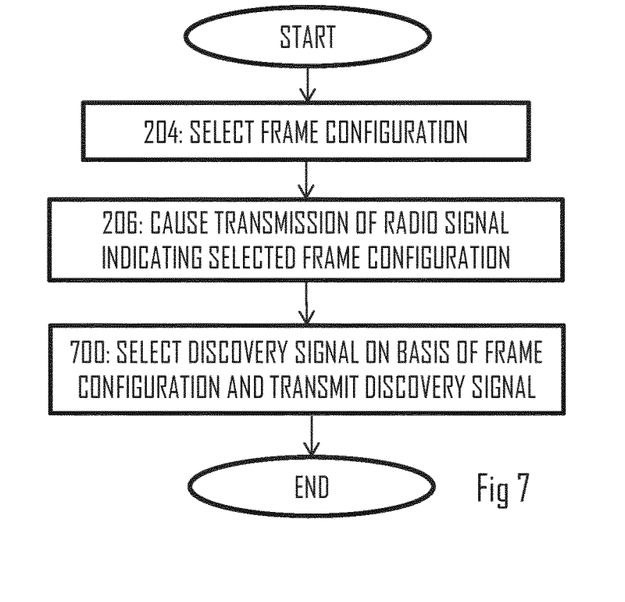

Provision of different radio frame configurations and, in some embodiments, sub-carrier spacings may complicate cell discovery in the terminal device 120. The cell discovery may be based on the network element 110 causing broadcast of a discovery reference signal the terminal device 120 is scanning for when performing cell search. FIGS. 6 and 7 illustrate some embodiments for facilitating cell search when employing the radio frame configurations according to some embodiments.

FIG. 6 illustrates an embodiment where the same discovery reference signal is broadcasted in every radio frame configuration. Referring to FIG. 5, the network element selects a radio frame configuration in block 204 and indicates the radio frame configuration in block 206. In block 600, the network element 110 causes transmission of a periodic discovery signal. Thereafter, the network element may select a new, different radio frame configuration in block 602 and indicates the new radio frame configuration in block 604. After block 604, the network element may transmit the discovery reference signal in block 606 with the same configuration as transmitted in block 600. In the embodiment, the network element may transmit periodic discovery signal with a predetermined, constant radio radio frame configuration, regardless of the radio radio frame configuration selected in blocks 204 and 602 and indicated in blocks 206 and 604.

The discovery reference signal may comprise the same sub-carrier spacing and periodicity for every radio frame configuration. If the transmission of the discovery reference signal occurs during an uplink part or a further uplink part, the transmission of the discovery reference signal may overrule the uplink transmission. For example, the network element 110 may refrain from scheduling uplink resources that overlap with the periodic transmission of the discovery reference signal. A terminal device noticing that it has been allocated with periodic uplink transmission resources specifying a transmission resource overlapping with the periodic discovery reference signal may refrain from transmitting in such a transmission resource. Typically, the periodicity of the allocated periodic uplink transmission resources is different from the periodicity of the discovery reference signal so the overlapping is only occasional.

In the embodiment of FIG. 6, the terminal device 120 may need to scan for a discovery signal by using only one scanning configuration adapted to the discovery signal.

In FIG. 7, the network element employs multiple discovery reference signal configurations. For example, the periodicity of the discovery reference signal and/or the sub-carrier spacing of the discovery reference signal may be adapted to each radio frame configuration. The discovery reference signal may follow a periodicity that maps the discovery reference signal to the downlink part, and the discovery reference signal may have the same sub-carrier spacing used for the other signals in the radio frame configuration.

Upon selecting the radio frame configuration in block 204, the network element 110 may select a discovery signal associated with the radio frame configuration and transmit the selected discovery signal in block 700.

Figure 8:
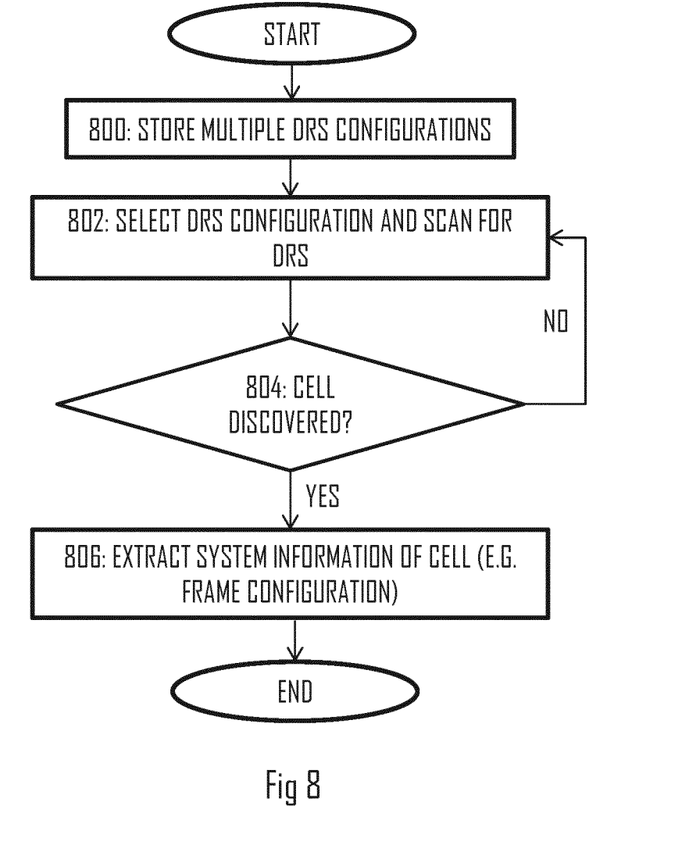
FIG. 8 illustrates a procedure for performing cell search in a terminal device according to an embodiment of the invention.

In the embodiment of FIG. 7, the terminal device 120 may scan for a discovery signal by using only multiple scanning configurations. FIG. 8 illustrates an embodiment of the scanning procedure carried out in the terminal device 120. Referring to FIG. 8, the terminal device may store multiple configurations for the search of the discovery reference signal (DRS) in block 800. The different configurations may define different periodicities and/or different sizes of a fast Fourier transform. The different sub-carrier spacings of the DRS may require a different length of the fast Fourier transform.

In block 802, the terminal device selects a DRS configuration and starts scanning a radio channel for the DRS mapped to the DRS configuration. The terminal device may scan for at least one period of the DRS derived from the periodicity of the DRS configuration. In block 804, the terminal device determines whether or not it has discovered the DRS of the DRS configuration. If not, the process may return to block 802 where the terminal device selects a new DRS configuration and starts a new scan. If the DRS was discovered, the terminal device may synchronize to a cell transmitting the DRS and extract system information of the cell from broadcast signal transmitted in the cell. The system information may define, for example, a radio frame configuration used in the cell.

In embodiments where the network element 110 support the radio frame configurations of Table 1 (legacy devices) and radio frame configurations of Table 2, there may be terminal devices that support only the radio frame configurations of Table 1 and terminal devices supporting the radio frame configurations of Table 1 and 2. It may be desirable that at least some of the terminal devices are able to use the radio frame configurations of Table 2 even in such a case. Let us now describe some embodiments enabling the network element to address this problem by allocating both types of terminal devices on the same carrier signal.

In an embodiment, a subset of sub-frames or even portions of sub-frames of a radio frame configuration support the legacy devices. The length of the sub-frame may be 1 ms in this embodiment. Table 5 illustrates an example of such a radio frame configuration.

TABLE 5

| Radio frame configuration | DL-to-UL Switch periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | SF | SF | D | S | SF | SF | SF |

As can be seen, the radio frame configuration is a modification of the radio frame configuration 0 of Table 1 where certain sub-frames are modified to be the flexible special sub-frames. The network element may configure the use of the radio frame configuration such that legacy devices are allocated to sub-frames that support the Table 1 sub-frame types (D, S, U), and devices supporting the flexible special types of sub-frames may be allocated to the corresponding sub-frames. Additionally, devices supporting the flexible special types of sub-frames may be allocated to sub-frames that support the Table 1 sub-frame types (D, S, U). Uplink sub-frames that do not contain HARQ ACK/NAKs of a physical uplink control channel (PUCCH) may be converted to the flexible special sub-frames SF when no physical uplink shared channel (PUSCH) is transmitted by the legacy devices. Uplink sub-frames U with the PUCCH HARQ may be converted to the flexible special sub-frames SF when unoccupied by the legacy devices.

All devices supporting the flexible special sub-frames may employ the uplink parts of the special sub-frames S with the assumption that the network element does not schedule a reference signal or a short random access channel (S-RACH) to the uplink parts.

The remaining sub-frames or sub-frame portions may be designated as the flexible special sub-frames SF. However, the network element may take the presence of legacy devices on each sub-frame when determining the sub-frame configuration. For example, the special sub-frames S may have a specific configuration for the downlink part DwPTS1 to provide sufficient resources for the legacy devices (including synchronization signals). The length of the downlink part may be higher than three symbols.

As another example, a sub-frame that causes transmission of a downlink HARQ-acknowledgment in the sub-frame 0 may be statically designated as a flexible special uplink sub-frame SU. A sub-frame containing uplink control information from one or more legacy devices may be maintained as an uplink frame, i.e. a downlink part may be omitted from it.

As another example, any downlink signal transmitted in the downlink sub-frame D or the special sub-frame S may keep legacy signals unchanged. Such legacy signals may include a primary synchronization signal, a secondary synchronization signal, and a cell-specific reference signal.

With respect to signaling the special sub-frame S configurations, the network element may signal the radio frame configuration through device-specific higher layer (layer 3, for example) signaling. Cells having no legacy devices may signal the special sub-frame configurations in a system information broadcasted in the cell. Flexible special sub-frame configurations may be signaled as described above with reference to FIG. 5.

The embodiments of Tables 1 to 5 are described in the context of time-division duplexing (TDD) system, e.g. both the first radio frame configuration and the second radio frame configuration employ TDD principles. The embodiments of FIGS. 2 and 3 are also applicable to a system employing frequency-division duplexing (FDD) or a supplementary downlink/uplink (SDL/SDU) scheme. The supplementary downlink/uplink may be defined as a supplementary carrier that supplements a primary carrier, wherein the supplementary carrier is used only for downlink/uplink transmission. The supplementary carrier is thus a supplementary downlink/uplink resource.

In such embodiments of FIGS. 2 and 3, the first radio frame configuration may be employed according to the FDD, SDL, and/or SDU. Table 6 below illustrates an embodiment of the first radio frame configuration in such a case.

TABLE 6

| Radio frame configuration | DL-to-UL Switch periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| A | — | D | D | D | D | D | D | D | D | D | D |
| B | — | U | U | U | U | U | U | U | U | U | U |
| C | 10 ms | D | S | D | D | D | D | D | D | D | D |
| D | 5 ms | D | S | D | D | D | S | D | D | D | D |
| E | 10 ms | U | S | U | U | U | U | U | U | U | U |

Referring to Table 6, the radio frame configuration A may be employed on a frequency band or carrier dedicated for downlink transmission according to the FDD or SDL scheme, and radio frame configuration B may be employed on a frequency band or carrier dedicated for uplink transmission according to the FDD or SDU scheme. In the case of FDD scheme, frame configurations A and B may be used concurrently as the first frame configuration. Radio frame configurations C and D are also employed for downlink bands and radio frame configuration E for an uplink band, and these radio frame configurations C to E employ a special sub-frame that may be the above-described special sub-frame S comprising the uplink part and the downlink part, e.g. UpPTS and DwPTS. In an embodiment, if the configuration is the SDL/SDU, the uplink part and the downlink part of the special sub-frame may be configured to be unused. The special sub-frame may be used to provide an additional uplink/downlink resource for a downlink/uplink scheme. For example, on an unlicensed frequency band there may be a maximum limit for a transmission duration, and the special sub-frame may be used as a break for the transmission.

In an embodiment, the network element 110 may employ a set of radio frame configurations comprising the first radio frame configuration selected from Table 6 with the second radio frame configuration selected from Table 2, for example. The first radio frame configuration may then be used on a first frequency band, while the second radio frame configuration is employed on a second frequency band operated by the network element 110. The two radio frame configurations may be in concurrent use.

In another embodiment, the network element may switch from the first radio frame configuration (of Table 6) to the second radio frame configuration (of Table 2) such that the first radio frame configuration is in use at a first time instant and and the second radio frame configuration is in use in a second time instant after the first time instant. The first radio frame configuration and the second radio frame configuration may then be operated on the same frequency band or on different frequency bands.

Figure 9:
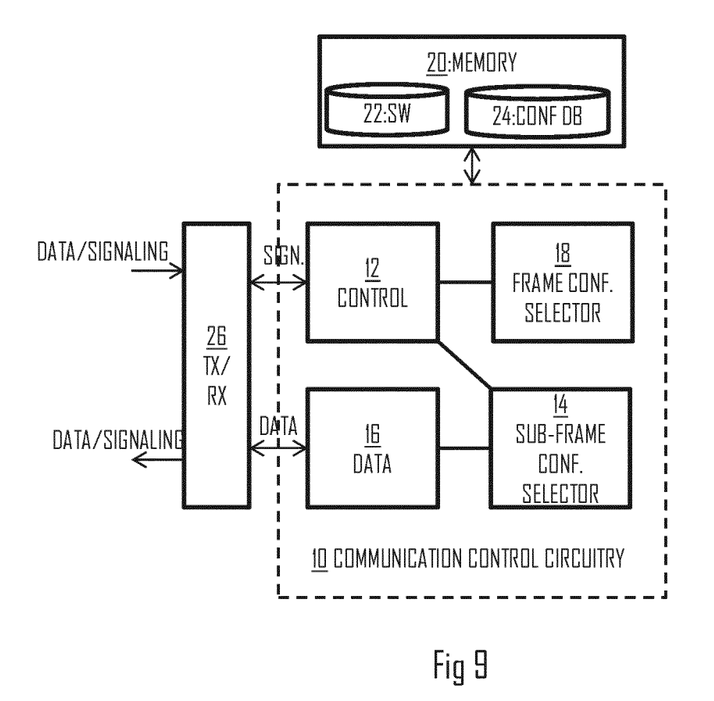
FIGS. 9 and 10 illustrate block diagrams of structures of apparatuses according to some embodiments of the invention.
Figure 10:
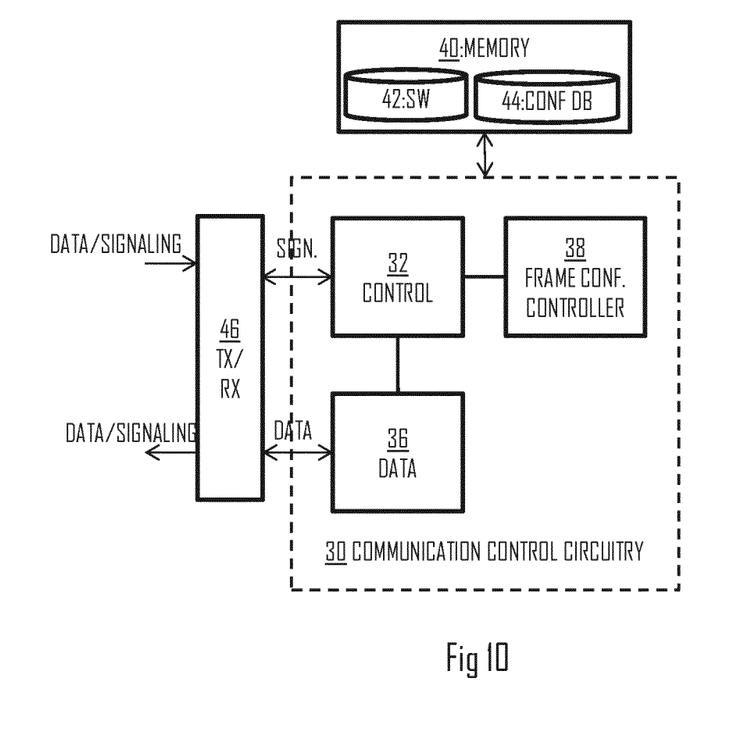

FIGS. 9 and 10 provide apparatuses according to some embodiments of the invention. FIG. 9 illustrates an apparatus configured to carry out the functions described above in connection with the network element 110. FIG. 10 illustrates an apparatus configured to carry out the functions described above in connection with the terminal device 120. Each apparatus may comprise a communication control circuitry 10, 30, such as at least one processor, and at least one memory 20, 40 including a computer program code (software) 22, 42 wherein the at least one memory and the computer program code (software) are configured, with the at least one processor, to cause the respective apparatus to carry out any one of the embodiments of each apparatus described above.

The memories 20, 40 may be implemented using any suitable data storage technology, such as semiconductor based memory devices, flash memory, magnetic memory devices and systems, optical memory devices and systems, fixed memory and removable memory. The memory may comprise a configuration database 24, 44 for storing configuration data for communicating in a cell over a radio interface. For example, the configuration databases 24, 44 may store the radio frame configurations supported by each apparatus, e.g. radio frame configurations of Table 1 and/or Table 2.

The apparatuses may further comprise a communication interface (TX/RX) 26, 46 comprising hardware and/or software for realizing communication connectivity according to one or more communication protocols. The communication interface may provide the apparatus with communication capabilities to communicate in the cellular communication system and enable communication the network element 110 and terminal device 120, for example. The communication interface 26, 46 may comprise standard well-known components such as an amplifier, filter, frequency-converter, (de)modulator, and encoder/decoder circuitries and one or more antennas. The communication interfaces 26, 46 may comprise radio interface components providing the network element 110 and the terminal device 120 with radio communication capability in the cell.

In an embodiment of FIG. 9, at least some of the functionalities of the network element 110 may be shared between two physically separate devices, forming one operational entity. Therefore, the apparatus may be seen to depict the operational entity comprising one or more physically separate devices for executing at least some of the described processes. Thus, the apparatus of FIG. 9, utilizing such a shared architecture, may comprise a remote control unit (RCU), such as a host computer or a server computer, operatively coupled (e.g. via a wireless or wired network) to a remote radio head (RRH) located in a base station site. In an embodiment, at least some of the described processes of the network element 110 may be performed by the RCU. In an embodiment, the execution of at least some of the described processes may be shared among the RRH and the RCU. In such a context, RCU may comprise the components illustrated in FIG. 9, and the communication interface 26 may provide the RCU with the connection to the RRH. The RRH may then comprise radio frequency signal processing circuitries and antennas, for example.

In an embodiment, the RCU may generate a virtual network through which the RCU communicates with the RRH. In general, virtual networking may involve a process of combining hardware and software network resources and network functionality into a single, software-based administrative entity, a virtual network. Network virtualization may involve platform virtualization, often combined with resource virtualization. Network virtualization may be categorized as external virtual networking which combines many networks, or parts of networks, into the server computer or the host computer (i.e. to the RCU). External network virtualization is targeted to optimized network sharing. Another category is internal virtual networking which provides network-like functionality to the software containers on a single system. Virtual networking may also be used for testing the terminal device.

In an embodiment, the virtual network may provide flexible distribution of operations between the RRH and the RCU. In practice, any digital signal processing task may be performed in either the RRH or the RCU and the boundary where the responsibility is shifted between the RRH and the RCU may be selected according to implementation.

Referring to FIG. 9, the apparatus may comprise a control circuitry 12 carrying out control plane signalling with terminal devices, other access nodes of the radio access network, and with network elements of the core network 130. The control circuitry 12 may carry out steps 206, 500, 504, 600, 604, 606, and 700 in the network element 110.

The apparatus may further comprise a radio frame configuration selection circuitry 18 configured to select a radio frame configuration amongst the radio frame configurations stored in the configuration database 24. Upon selecting the radio frame configuration, the radio frame configuration selector may instruct the control circuitry 12 to broadcast the radio frame configuration as system information in the cell controlled by the first network element. The apparatus may further comprise a sub-frame configuration selector circuitry 14 configured to dynamically select a sub-frame configuration for each flexible special sub-frame. The sub-frame configuration selector circuitry 14 may then instruct the control part to include in each flexible special sub-frame an information element indicating the sub-frame configuration of the sub-frame. The sub-frame configuration may define whether the flexible special sub-frame is a flexible special downlink sub-frame or a flexible special uplink sub-frame.

The apparatus may further comprise a data communication circuitry 16 configured to carry out transmission and reception of payload data. The data communication circuitry 16 may receive, for each flexible special sub-frame, an indication from the sub-frame configuration selector circuitry 14 whether the flexible special sub-frame comprises a further downlink part or a further uplink part. If the flexible special sub-frame comprises the further downlink part, the data communication circuitry may control transmission of data in the further downlink part. If the flexible special sub-frame comprises the further uplink part, the data communication circuitry 16 may extract data from the further uplink part.

Referring to FIG. 10, the apparatus may comprise a control circuitry 32 carrying out control plane signalling with one or more network elements of the cellular communication system, e.g. the access node 110. The control circuitry 32 may also carry out cell search procedures. The control circuitry 32 may carry out steps 304, 500, 504, and 802 in the terminal device 120.

The apparatus may further comprise a radio frame configuration controller 38 configured to determine, on the basis of system information received from the network element, a radio frame configuration used in the cell and configure the control circuitry 32 to implement the radio frame configuration in uplink and downlink communications in the cell.

The apparatus may further comprise a data communication circuitry 16 configured to carry out transmission and reception of payload data. The data communication circuitry 36 may receive, for each flexible special sub-frame, an indication from the control circuitry 32 whether the flexible special sub-frame comprises a further downlink part or a further uplink part. If the flexible special sub-frame comprises the further uplink part, the data communication circuitry 36 may control transmission of data in the further uplink part. If the flexible special sub-frame comprises the further downlink part, the data communication circuitry 36 may extract data from the further downlink part.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

In an embodiment, at least some of the processes described in connection with FIGS. 2 to 8 may be carried out by an apparatus comprising corresponding means for carrying out at least some of the described processes. Some example means for carrying out the processes may include at least one of the following: detector, processor (including dual-core and multiple-core processors), digital signal processor, controller, receiver, transmitter, encoder, decoder, memory, RAM, ROM, software, firmware, display, user interface, display circuitry, user interface circuitry, user interface software, display software, circuit, antenna, antenna circuitry, and circuitry. In an embodiment, the at least one processor, the memory, and the computer program code form processing means or comprises one or more computer program code portions for carrying out one or more operations according to any one of the embodiments of FIGS. 2 to 8 or operations thereof.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 8 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
   storing, in a terminal device of a cellular communication system, definitions for a first radio frame configuration defining a frame structure of a radio frame comprising at least one sub-frame dedicated only for downlink transmission;
   storing, in the terminal device, definitions for a second radio frame configuration defining a frame structure of a radio frame comprising at least one flexible special sub-frame configurable as either a downlink sub-frame or as an uplink sub-frame, wherein the flexible downlink sub-frame and the flexible uplink sub-frame both comprise an uplink part and a downlink part, and wherein both the uplink part and the downlink part carry at least one of control information and a reference signal;

receiving, from a network element of a cellular communication system, a radio signal carrying an information element indicating a radio frame configuration applied in a cell of the cellular communication system; and selecting, on the basis of the received information element, a radio frame configuration amongst a set of radio frame configurations comprising at least the first radio frame configuration and the second radio frame configuration and using the selected frame configuration in communication with the network element in the cell.

2. The method of claim 1, wherein the first radio frame configuration further comprises at least one sub-frame dedicated only for uplink transmission, and at least one special sub-frame comprising an uplink part and a downlink part.

3. The method of claim 1, wherein the flexible special sub-frame comprises a further uplink part or a further downlink part depending on whether the flexible sub-frame is configured as the flexible uplink sub-frame or the flexible downlink sub-frame.

4. The method of claim 1, wherein the terminal device stores definitions for a plurality of different radio frame configurations each defining said at least one flexible special sub-frame, wherein at least two of the plurality of different radio frame configurations have a different sub-frame length.

5. The method of claim 4, wherein a radio frame configuration having a greater sub-frame length has a smaller sub-carrier spacing in sub-frames.

6. The method of claim 1, further comprising in the terminal device:

receiving flexible special sub-frame and, together with the flexible special sub-frame, an indication of whether the flexible special sub-frame is a flexible special downlink frame or a flexible special uplink frame; and applying to the received flexible special sub-frame a sub-frame structure mapped to the received indication.

7. An apparatus comprising:
at least one processor, and
at least one memory comprising a computer program code, wherein the processor, the memory, and the computer program code are configured to cause the apparatus to:
provide a first radio frame configuration defining a frame structure of a radio frame comprising at least one sub-frame dedicated only for downlink transmission;
provide a second radio frame configuration defining a frame structure of a radio frame comprising at least one flexible special sub-frame configurable as either a flexible downlink sub-frame or as a flexible uplink sub-frame, wherein the flexible downlink sub-frame and the flexible uplink sub-frame both comprise an uplink part and a downlink part, and wherein both the uplink part and the downlink part carry at least one of control information and a reference signal; and
select, amongst a set of radio frame configurations comprising at least the first and second radio frame configuration, a radio frame configuration and causing transmission of a radio signal carrying an information element indicating the selected radio frame configuration.

8. The apparatus of claim 7, wherein the first radio frame configuration further comprises at least one sub-frame dedicated only for uplink transmission and at least one special sub-frame comprising an uplink part and a downlink part.

9. The apparatus of claim 7, wherein the processor, the memory, and the computer program code are configured to cause the apparatus to provide a plurality of different radio frame configurations each defining said at least one flexible special sub-frame, wherein at least two of the plurality of different radio frame configurations have a different sub-frame length.

10. The apparatus of claim 9, wherein a radio frame configuration having a greater sub-frame length has a smaller sub-carrier spacing in sub-frames.

11. The apparatus of claim 7, wherein the flexible special sub-frame of the second radio frame configuration has a greater maximum length of an uplink part than a maximum length of an uplink part of the special sub-frame of the first radio frame configuration.

12. The apparatus of claim 7, wherein the flexible special sub-frame comprises a further uplink part or a further downlink part depending on whether the flexible sub-frame is configured as the flexible uplink sub-frame or the flexible downlink sub-frame.

13. The apparatus of claim 12, wherein the further uplink part carries uplink data and the further downlink part carries downlink data.

14. An apparatus comprising:
at least one processor, and
at least one memory comprising a computer program code, wherein the processor, the memory, and the computer program code are configured to cause the apparatus to:
store, in the at least one memory, definitions for a first radio frame configuration defining a frame structure of a radio frame comprising at least one sub-frame dedicated only for downlink transmission;
store, in the at least one memory, definitions for a second radio frame configuration defining a frame structure of a radio frame comprising at least one flexible special sub-frame configurable as either a downlink sub-frame or as an uplink sub-frame, wherein the flexible downlink sub-frame and the flexible uplink sub-frame both comprise an uplink part and a downlink part, and wherein both the uplink part and the downlink part carry at least one of control information and a reference signal;
receive, from a network element of a cellular communication system, a message carrying an information element indicating a radio frame configuration applied in a cell of the cellular communication system; and
select, on the basis of the received information element, a radio frame configuration amongst a set of radio frame configurations comprising at least the first radio frame configuration and the second radio frame configuration and using the selected frame configuration in communication with the network element in the cell.

15. The apparatus of claim 14, wherein the first radio frame configuration further comprises at least one sub-frame dedicated only for uplink transmission, and at least one special sub-frame comprising an uplink part and a downlink part.

16. The apparatus of claim 14, wherein the flexible special sub-frame comprises a further uplink part or a further downlink part depending on whether the flexible sub-frame is configured as the flexible uplink sub-frame or the flexible downlink sub-frame.

17. The apparatus of claim 16, wherein the further uplink part carries uplink data and the further downlink part carries downlink data.

18. The apparatus of claim 14, wherein the processor, the memory, and the computer program code are configured to cause the apparatus to store definitions for a plurality of different radio frame configurations each defining said at least one flexible special sub-frame, wherein at least two of the plurality of different radio frame configurations have a different sub-frame length.

19. The apparatus of claim 18, wherein a radio frame configuration having a greater sub-frame length has a smaller sub-carrier spacing in sub-frames.

20. The apparatus of claim 14, wherein the flexible special sub-frame of the second radio frame configuration has a greater maximum length of an uplink part than a maximum length of an uplink part of the special sub-frame of the first radio frame configuration.

21. The apparatus of claim 14, wherein the processor, the memory, and the computer program code are configured to cause the apparatus to:
 receive flexible special sub-frame and, together with the flexible special sub-frame, an indication of whether the flexible special sub-frame is a flexible special downlink frame or a flexible special uplink frame; and
 apply to the received flexible special sub-frame a sub-frame structure mapped to the received indication.

\* \* \* \* \*